United States Patent [19]

Gutierrez et al.

[11] Patent Number: 4,985,627

[45] Date of Patent: Jan. 15, 1991

[54] SPIN-POLARIZED SCANNING TUNNELING MICROSCOPE

[75] Inventors: Santos F. A. Gutierrez, Rüschlikon; Alexis Baratoff, Schönenberg; Wolfgang D. Pohl, Adliswil, all of Switzerland

[73] Assignee: International Business Machines Corporation, Armonk, N.Y.

[21] Appl. No.: 391,908

[22] Filed: Aug. 10, 1989

[30] Foreign Application Priority Data

Aug. 18, 1988 [EP] European Pat. Off. ........ 88810570.7

[51] Int. Cl.⁵ ............................................. H01J 37/26
[52] U.S. Cl. .................................... 250/306; 250/307
[58] Field of Search ................................ 250/306, 307

[56] References Cited

U.S. PATENT DOCUMENTS 4,343,993  8/1982  Binnig et al. ................... 250/306
4,837,435  6/1989  Sakuhara et al. ................ 250/307

FOREIGN PATENT DOCUMENTS 0027517  8/1980  European Pat. Off. .
0272178  11/1987  European Pat. Off. .
62-139240  6/1987  Japan ............................... 250/306

Primary Examiner—Jack I. Berman
Attorney, Agent, or Firm—Philip J. Feig

[57] ABSTRACT

In a scanning tunneling microscope, the tunnel tip comprises an optically transparent body coated with a semiconductor layer, such as a GaAs layer. A sample being investigated comprises a magnetic material. Tunnel microscope operation permits investigation of the magnetic properties at or near the surface of the sample where a spin-polarized beam of light impinges upon the sample surface, through the transparent body of the tunnel tip, or after traveling through the sample, or when made to impinge upon the surface at an angle of incidence from an axis normal to the sample surface. In addition to conventional scanning tunneling microscope electronics, an oscillator-controlled phase-sensitive detector or gating means and a display unit are provided for direct viewing of the magnetic properties and the topography of the sample.

7 Claims, 3 Drawing Sheets

SPIN-POLARIZED SCANNING TUNNELING MICROSCOPE

BACKGROUND OF THE INVENTION

The present invention relates to scanning funneling microscopes which by means of optically induced spin polarization measure the magnetic properties of surfaces.

Scanning tunneling microscopy per se is well known in the art to permit the inspection of surface topographies down to the atomic level, based on the strong dependency of the tunneling current upon the distance of the tunnel tip from the surface being investigated. A summary of the features of scanning tunneling microscopy is provided by the inventors of the Scanning Tunneling Microscope, G. Binnig and H. Rohrer, "Scanning Tunneling Microscopy", IBM Journal of Research and Development, Vol. 30, No. 4, July 1986, pp. 355-369, where a useful catalogue of relevant literature published prior to 1986 is provided.

As is well known, the tip of a scanning tunneling microscope closely follows the profile of the surface under investigation by monitoring the tunneling current and providing a feedback signal dependent on the deviation of the distance between the tip and surface from a predetermined value. By registering the feedback signal with the coordinates of the tip at the time of registration, an image of the topography of the surface is generated. The resolution obtainable is on the order of the size of a single atom.

Qualitative information at comparable resolution, i.e. information regarding the chemical elements present at (or near) the surface of a specimen may be obtained from a field-emission scanning Auger electron microscope of the type described in EP-A-1-0 189 498. The energy of the Auger electrons emitted by a material hit by a sharply focused field-emitted electron beam is characteristic of the emitting element.

Neither the scanning tunneling microscope nor the Auger electron microscope can provide information on the magnetic properties of the surface of a specimen. And no other instrument is known today which would permit the detection of magnetic phenomena on a surface with a resolution close to the atomic level.

In connection with a search for storage devices having higher packing densities, it has been proposed in IBM Technical Disclosure Bulletin, Vol. 30, No. 4, September 1986, p. 1858, to employ a tunnel tip operated in the spin-polarized mode. In this proposal, the spin-polarization is obtained through the use of a tungsten tip having a thin layer of a ferromagnetic semiconductor such as EuS or EuO, coated thereon. The cryogenic environment required by these materials can be avoided by employing a half-metallic ferromagnet, such as a Heusler alloy, NiMnSb or PtMnSb, or $CrO_2$, in accordance with the teaching in IBM Technical Disclosure Bulletin, Vol. 30, No. 7, December 1987, p 140.

Field-emission of spin-polarized electrons is further described in M. Landolt and Y. Yafet, "Spin-Polarization of Electrons Field Emitted from Single-Crystal Iron Surfaces", Phys. Rev. Lett. Vol. 40, No. 21, 22 May 1978, pp. 1401-1403. This paper in particular deals with the preparation and characteristics of single-crystal iron tips. However, the tips that can be prepared with the process described in this paper, have a radius approximately 10 times too large at its apex to be useful in connection with the present invention.

SUMMARY OF THE INVENTION

A principal object of the present invention is therefore, the provision of a scanning tunneling microscope in which spin-polarization is employed to detect the magnetic properties of a material at the point of impingement of a spin-polarized electron beam.

This and other objects of the invention are achieved with a spin-polarized scanning tunneling microscope comprising a tunnel tip disposed opposite the surface of a sample to be investigated separated by a gap having a width between 0.1 and 10 nm, an xyz-drive for positioning the tunnel tip at the gap and for causing the tunnel tip to be raster-scanned across the sample surface, and electronic circuitry for maintaining the width of said gap essentially constant. The scanning tunneling microscope is characterized in that the tunnel tip and the sample to be investigated comprise, at least in part, different materials, one of the materials being a magnetic material, the other being a semiconductor material, and a light source is provided for emitting a beam of polarized light, the light beam made to impinge upon said surface at a point closest to the apex of the tunnel tip.

A fuller understanding of the invention will become more clearly apparent when the following description is read in conjunction with the accompanying drawings.

DETAILED DESCRIPTION

The present invention is based on the knowledge that tunneling microscopy is feasible with optionally oriented spin-polarized electrons between a semiconductor and a magnetically conducting material. This involves spin-polarized conduction electrons, and/or valence holes, the polarization vector of which can be modulated by optical means, on one side of the tunnel barrier, and a magnetic material on the other. The order of magnitude of the currents to be expected is exemplified by a photoexcited tunneling current of about 10 nA having been measured between a gold tip and a gallium arsenide (110) surface.

For maximum discrimination between spin-up and spin-down tunneling currents—the direction of which is determined by the direction of magnetization of the material near its surface—the magnetic material should be nearly fully polarized and have a large surface exchange splitting ($\geq 1$ eV). This is achieved, e.g., for Fe(100) and rare earth compounds, the magnetic spins of which can be oriented by external fields.

As sources of polarized electrons, compounds of the III/V, II/IV/V, II/III/VI groups of elements, and other semiconductors generally having a large valence band spin-orbit splitting and a long carrier diffusion length are preferred. In these materials, up/down spin-polarized electrons can be photoexcited into the conduction band by right/left circularly polarized light. Reference is made to F. Meier and B.P. Zakharchenya (ed.), "Optical Orientation", North-Holland 1984, p. 486.

Figure 1:
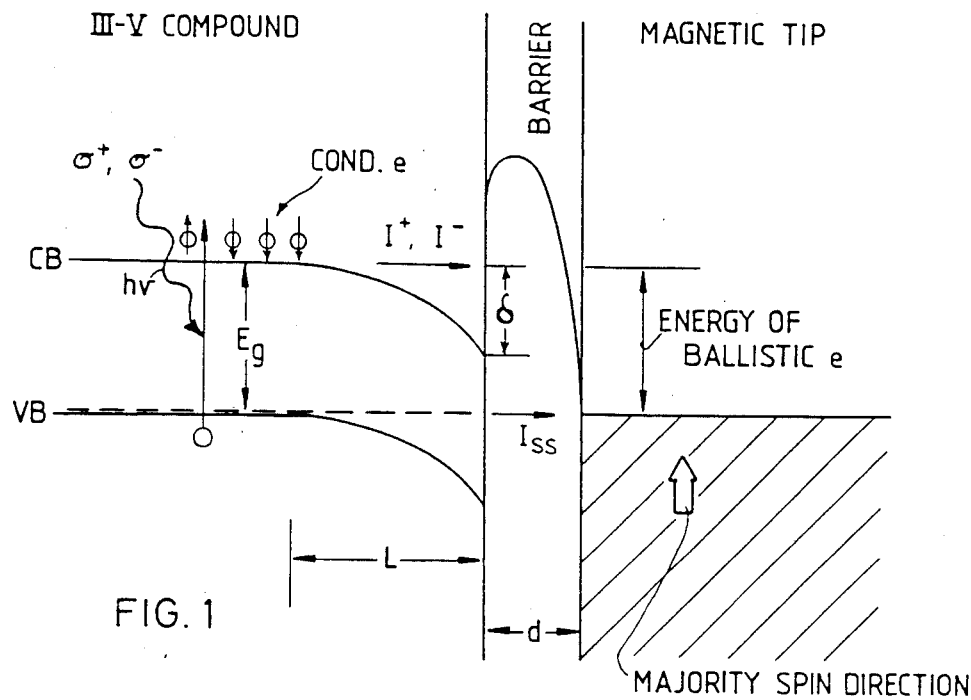
FIG. 1 is a schematic energy diagram of the tunnel region for a p-doped GaAs sample and a magnetic tip.

In the schematic energy diagram of FIG. 1 relating to the tunnel region (barrier) between a III-V compound, typically p-doped gallium arsenide, and a magnetic tunnel tip, d is the barrier width, i.e. the distance between the tip and the surface, $\delta$ having a value of $\delta$ (0⊖δ⊖1 eV) which largely depends on the finish of the surface of the III-V compound is the band bending, L is the depletion zone depth ($\sim 5 \ldots 15$ nm) $I_{ss}$ is the surface state tunneling current, $I+,I-$ are the tunneling currents excited by right or left polarized light, respectively, CB designates the conduction band, VB designates the valence band, $E_f$ is the Fermi energy, $E_g$ is the energy difference of the band gap and, $\sigma+,\sigma-$ denote right/left circularly polarized photons of the energy $h\gamma = E_g$.

The tunneling currents $I+,I-$ resulting from the impingement of the $\sigma+,\sigma-$ polarized photon beam are related to the magnetization of the ferromagnetic material by the asymmetry term $$A_T = \frac{I^+ - I^-}{I^+ + I^- + 2I_b},$$

wherein $I_b$ is the background tunneling current due to thermal excitations, and which is exponentially small in a finite range around zero tunneling voltage. The current $I_b$ is independent of the helicity, i.e. rotary direction of polarization, of the exciting light. The currents, $I_b$ as well as $I+,I-$ can contain surface state contributions $I_s$ which could change due to photoexcited electrons falling into surface states of the semiconductor prior to tunneling. In such as case, $I_s+ \neq I_s-$. This effect can modify, and even enhance the tunnel asymmetry. The magnetic tip beyond the gap has an energy on the Fermi level with a majority spin-up magnetization.

It is to be noted that topography measurement by either constant current or constant tip-to-sample distance is possible during spin polarized tunneling.

The tunneling current asymmetry will arise from the spin-polarization of both the sample and tip, and from their coupling via spin-conserving wave-function matching across the potential barrier. It should be noted that the proportionality of $I+,I-$ to the total spin-up/down densities of states is in general not expected to be restored by the matching of the wave-functions. Indeed, those densities, as well as the polarization inside the magnet, are dominated by d or f wave-function components, whereas $I+,I-$ are determined by the overlap of usually less polarized wave-function tails or, to a good approximation, by the product of suitably weighted local densities of states.

The latter can in turn be estimated from separate measurements, namely the spin-polarized photoelectron escape from the semiconductor, and the inverse photoemission from the magnet, respectively. The asymmetry $A_t$ can be estimated from the product $P_c \cdot P_m \cdot \cos\theta$, where $P_c$ is the polarization of the conduction electrons reaching the tunneling region, $P_m$ is the polarization of electrons tunneling into the empty magnetic states near the Fermi level of the magnet, and $\theta$ is the angle between $P_c$ and $P_m$. Approximating $P_c$ by its value for photoexcited GaAs(100), $P_c \approx 0.3$, and $P_m$ by its value determined from polarized isochromat spectroscopy measurements. For example, on Ni(110), $P_m \approx 0.5$. Accordingly, the expected result is approximated $$A_T = 0.5 \times 0.3 = 0.15,$$
$$\text{for } \theta = 0,$$

(cf. D. T. Pierce, A. Sieler, C. S. Feigerie, J. L. Pena and R. J. Celotta "Spin Polarized Inverse Photoemission Studies of Surface Magnetism and Electronic Structure", Journ. of Magnetism and Magn. Materials 54–57 (1986) pp. 617–621). On Fe(100), the corresponding value is $P_m \approx 0.2$. Accordingly, the expected result is approximated $$A_T = 0.25 \times 0.3 = 0.06,$$
$$\text{for } \theta = 0,$$

(cf. J. Kirschner, M. Glöbel, V. Dose and H. Scheidt "Wave-Vector-Dependent Temperature Behavior of Empty Bands in Ferromagnetic Iron", Phys. Rev. Lett. Vol. 53, No. 6, August 1984, pp. 612–615).

Figure 2:
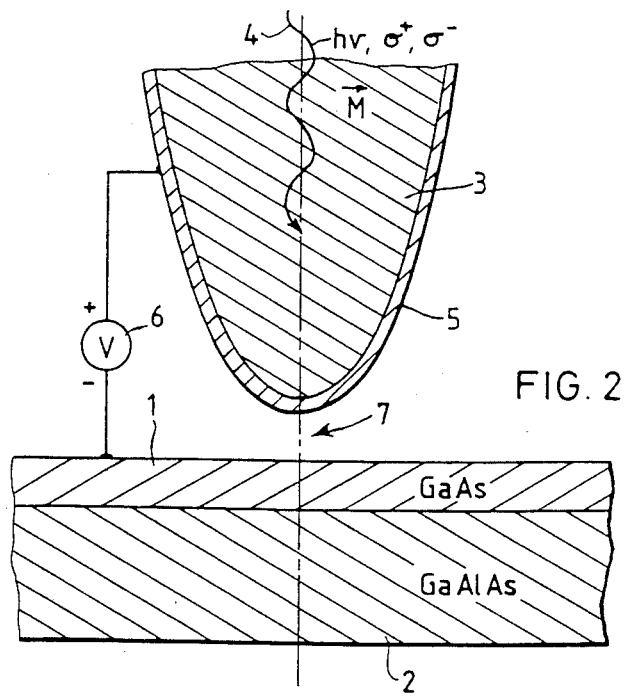
FIG. 2 illustrates an embodiment of a scanning tunneling microscope in accordance with the present invention.

These relations apply to the scanning tunneling microscope shown in FIG. 2. Disclosed opposite a semiconductor layer 1, such as n- or p-doped gallium arsenide GaAs, which may optionally be supported on a substrate 2 comprising, for example, gallium aluminium arsenide GaAlAs, is a tunnel tip 3 comprising magnetic material. The magnetic material used can be in whisker form, such as iron, or magnetic material evaporated onto a tungsten tip, or onto an optionally transparent crystal.

Depending on the nature of tunnel tip 3, three modes of operation are conceivable. In the first mode, the exciting light beam 4 having an energy of $h\gamma$ enters from the back into tunnel tip 3. This mode of operation obviously requires an optically transparent tip, comprising, e.g., crystal material coated with a very thin metal layer 5, such as iron. With the thickness envisioned for this purpose, iron layer 5 may still be considered transparent to a laser beam. A voltage source 6, connected between semiconductor layer 1 and tip 3 provides the necessary tunneling voltage across gap 7. With this arrangement, the spin-polarization effect due to surface states, both intrinsic and/or related to defects, steps, adsorbates, etc., on the semiconductor surface is possible.

The optimum wave length of the laser light beam used in connection with the invention depends on the chemistry of the semiconductors employed. For $Al_x Ga_{1-x}As$ or $GaAs_xP_{1-x}$, the wavelength $\lambda$ should be in the range between 690 nm $\leq \lambda \leq$ 820 nm.

Figure 3:
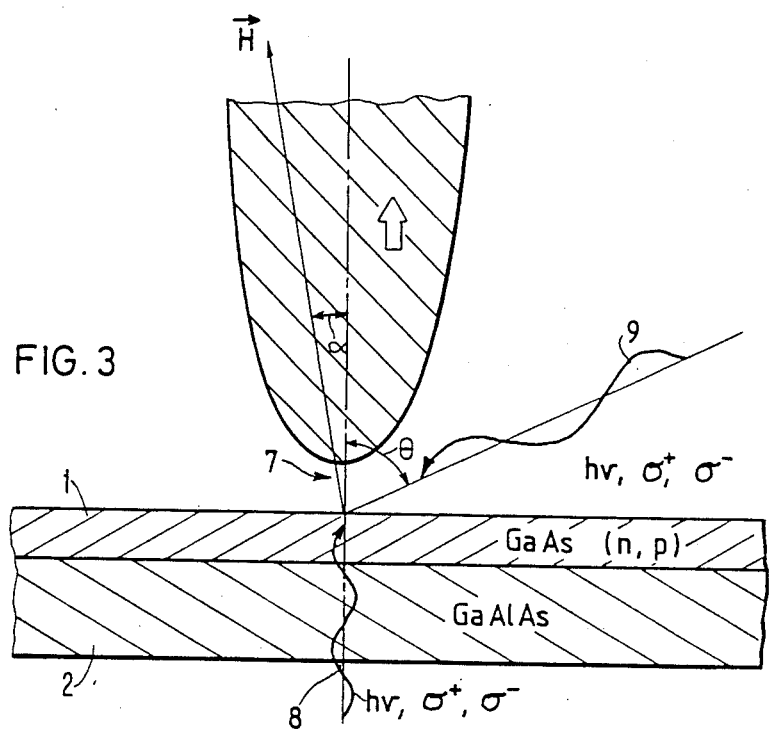
FIG. 3 illustrates an alternative embodiment of a scanning tunneling microscope in accordance with the present invention.

FIG. 3 shows substantially the same arrangement as FIG. 2, with either of two differences. The first difference is when the exciting light beam 8 is transmitted from below (as shown) through the semiconductor layer 1 (and substrate 2, if any) and the second difference is when the light beam 9 impinges onto the surface of the semiconductor layer 1 at an angle on incidence $\theta$ from the normal axis.

Figure 4:
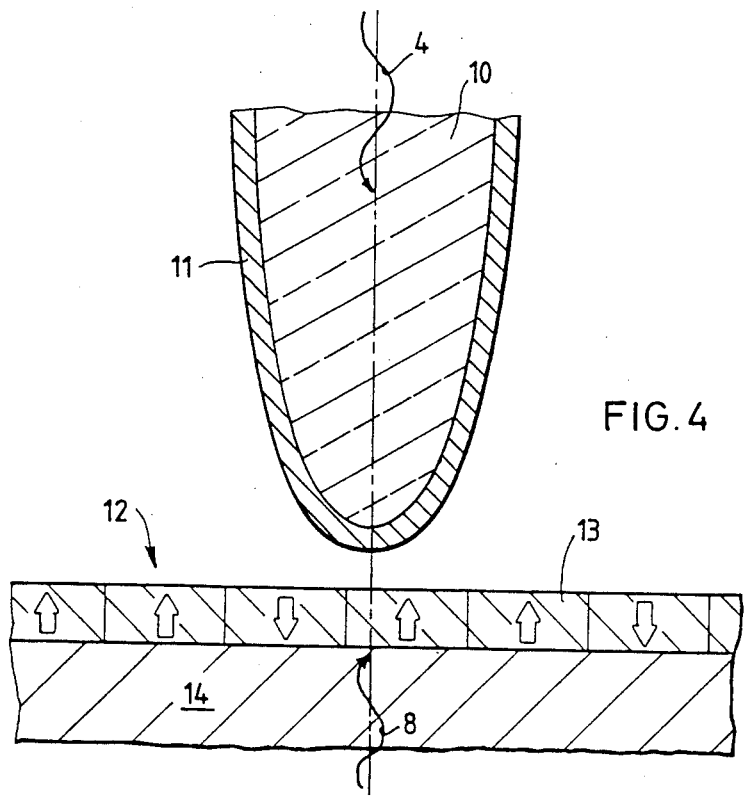
FIG. 4 illustrates another alternative embodiment of a scanning tunneling microscope in accordance with the present invention.

An alternative arrangement is shown in FIG. 4. Tip 10 comprises optically transparent material, such as glass, for example, and is coated with a thin layer 11 of gallium arsenide. Tip 10 is placed close to the surface of a magnetic medium 12, such as a magnetic film 13 disposed on a substrate 14. Again, as described above, there are three modes of operation. The optical energy hγ is supplied (1) through tip 10 from the back, (2) from the side at an angle of incidence θ (now shown), and (3) from underneath magnetic film 13, respectively. With any one of these three modes, the domain structure of the magnetic surface may be investigated with unprecedented resolution.

An important advantage of the optical orientation is that the direction of the spin-polarization vector $P_o$ can be controlled via the helicity of the exciting light, as well as by the angle of incidence θ of the light beam. To orient $P_o$ perpendicular to the magnetic surface, optical excitation through tip 10 or through the flat surface is necessary. In all cases, rapid modulation of either control parameter together with phase-sensitive detection is of the essence.

Figure 5:
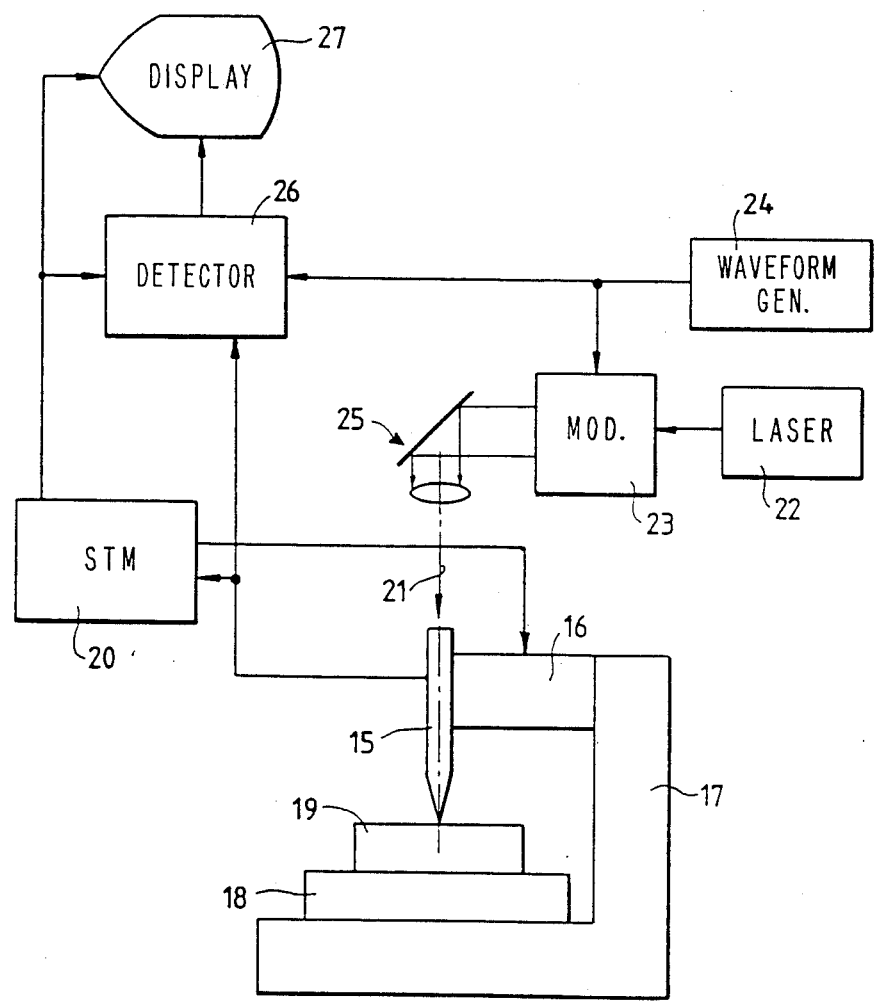
FIG. 5 is a schematic block diagram of the components comprising the scanning tunneling microscope in accordance with the invention.

FIG. 5 shows a schematic block diagram with the arrangement of the circuitry and building blocks of a scanning tunneling microscope in accordance with the present invention. Tunnel tip 15 is position-controlled by an xyz-drive 16 which is fixed to a frame 17 of a table 18 upon which table the sample to be inspected is disposed. As is known to those skilled int he art, xyz-drive 16 controls the relative position of tunnel tip 15 with respect to sample 19 such that the distance between tip 15 and the surface of sample 19 is kept constant by means of a feedback signal from conventional STM electronics 20.

In the embodiment shown in FIG. 5, tip 15 is of the transparent type, and the circuitry polarized light beam 21 enters the back of tip 15. The light beam is generated by a laser 22 and passed through a modulator 23 which causes the light beam to be right- or left-polarized in accordance with a signal received from a waveform generator 24. A lens and mirror system 25 serves to direct the light beam to the back of tunnel tip 15.

Also connected to the output of waveform generator 24 is the input of a phase-sensitive detector 26. The detector 26 receives a second input signal from tunnel tip 15. The function of detector 26 may also be performed through gating or by means of digital electronics. A display unit 27 is connected to the STM electronics 20 and to said phase-sensitive detector 26. The detector 26 also receives an input signal from STM electronics 20.

While the present invention makes use of the features of the scanning tunneling microscope, it will be obvious to those skilled in the art that as the distance between tip 15 and sample 19 is increased, tunneling will cease and the apparatus will go into the field-emission mode of operation. It is expected that with the invention, both in field-transmission and conventional tunneling microscope modes of operation, in-plane resolution of magnetic features from atomic scales up to between 1 and 10 nanometers can be achieved.

What is claimed is:

1. A spin-polarized scanning tunneling microscope comprising: a tunnel tip disposed opposite a surface of a sample to be investigated separated by a gap having a width of between 0.1 and 10 nm, an xyz-drive for positioning said tunnel tip at the gap and for causing said tunnel tip to be raster-scanned across said surface, and electronic circuitry for maintaining the width of the gap essentially constant, characterized in that said tunnel tip, and the sample to be investigated comprise, at least in part, different materials, one of the materials being a magnetic material, and the other of the materials being a semiconductor material, and that a light source transmit a beam of circularly polarized light, the light beam being caused to impinge upon the surface at a point closest to the apex of said tunnel tip and the light beam traveling through said tunnel tip of traveling through the sample of impinging upon the surface at an oblique angle of incidence.

2. A microscope as set forth in claim 1, wherein said tunnel tip comprises a magnetic material, the sample comprises a semiconductor material, and the light beam impinges upon the surface of the sample at an oblique angle of incidence.

3. A microscope as set forth in claim 1, wherein said tunnel tip consists of an optically transparent material and is coated with a layer of magnetic material, the sample comprises a semiconductor material, and the light beam impinges upon the surface of the sample at an oblique angle of incidence.

4. A microscope as set forth in claim 1, wherein said tunnel tip comprises an optically transparent material coated with a metal layer, the sample comprises a semiconductor material, and the light beam impinges upon the surface of the sample through the transparent material of said tunnel tip, said metal layer having a thickness sufficiently transparent to said light beam.

5. A microscope as set forth in claim 1, wherein said tunnel tip comprises an optically transparent body coated with a semiconductor layer, the sample comprises a magnetic material, and the light beam impinges upon the surface of the sample through the transparent material of said tunnel tip, said semiconductor layer having a thickness permitting electrons to reach the tunneling region.

6. A microscope as set forth in claim 1, wherein said tunnel tip comprises an optically transparent body coated with a semiconductor layer, the sample comprises a transparent magnetic material, and the light beam is transmitted to the surface of the sample through the transparent magnetic material of the sample, said magnetic material having a thickness sufficiently transparent to said light beam.

7. A microscope as set forth in claim 1, wherein said light source is optically connected to a helicity-determining modulator the output beam of said modulator being transmitted onto the surface of the sample via a lens/mirror system, said modulator being connected to a waveform generator, and further comprising a phase-sensitive detector for controlling a display unit, said detector having inputs connected to said tunnel tip, said electronic circuitry and to said waveform generator.

* * * * *